(12) United States Patent
Olson et al.

(10) Patent No.: US 8,937,791 B1
(45) Date of Patent: Jan. 20, 2015

(54) SLIDER HAVING HEATER WITH ADJACENT HIGH THERMAL CONDUCTIVITY LAYER

(71) Applicant: Seagate Technology LLC, Cupertino, CA (US)

(72) Inventors: Daniel W. Olson, Minneapolis, MN (US); Declan Macken, Prior Lake, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/091,451

(22) Filed: Nov. 27, 2013

(51) Int. Cl.
*G11B 5/60* (2006.01)

(52) U.S. Cl.
USPC .................................................. 360/234.4

(58) Field of Classification Search
CPC ........... G11B 5/60; G11B 17/32; G11B 21/20
USPC .......................................... 360/234.4, 234.5
See application file for complete search history.

(56) References Cited

U.S. PATENT DOCUMENTS

| | | | |
|---|---|---|---|
| 5,991,113 A | 11/1999 | Meyer et al. | |
| 6,654,202 B2 | 11/2003 | Rea et al. | |
| 6,975,472 B2 | 12/2005 | Stover et al. | |
| 7,123,447 B2 | 10/2006 | Pendray et al. | |
| 8,238,150 B2 | 8/2012 | Ohmori | |
| 2005/0272694 A1 | 12/2005 | Umehara et al. | |
| 2006/0034013 A1* | 2/2006 | Kato et al. | 360/128 |
| 2006/0285248 A1* | 12/2006 | Pust et al. | 360/128 |
| 2007/0035881 A1* | 2/2007 | Burbank et al. | 360/234.3 |
| 2008/0023468 A1 | 1/2008 | Aoki et al. | |
| 2009/0251828 A1* | 10/2009 | Schreck et al. | 360/319 |
| 2009/0316302 A1* | 12/2009 | Aoki | 360/234.3 |
| 2010/0157477 A1* | 6/2010 | Morinaga et al. | 360/125.12 |
| 2010/0226044 A1* | 9/2010 | Iwase | 360/234.3 |
| 2010/0265618 A1* | 10/2010 | Boutaghou et al. | 360/234.3 |
| 2011/0267715 A1 | 11/2011 | Heim et al. | |
| 2012/0127602 A1* | 5/2012 | Li et al. | 360/75 |
| 2012/0300334 A1* | 11/2012 | Hsiao et al. | 360/59 |
| 2013/0163108 A1 | 6/2013 | Hutchinson et al. | |

* cited by examiner

*Primary Examiner* — Allen T Cao
(74) *Attorney, Agent, or Firm* — HolzerIPLaw, PC

(57) ABSTRACT

A slider having a slider body having an air bearing surface, a leading edge and a trailing edge, and a transducer on the air bearing surface proximate the trailing edge, the transducer comprising a read sensor and a write sensor. The slider also has a heater, positioned proximate the transducer, and a continuous dielectric layer comprising a dielectric material having a coefficient of thermal conductivity of at least 20 W/m-K, the dielectric layer positioned adjacent to and in contact with the heater and between the heater and the transducer.

20 Claims, 2 Drawing Sheets

SLIDER HAVING HEATER WITH ADJACENT HIGH THERMAL CONDUCTIVITY LAYER

SUMMARY

The present disclosure provides a slider having heater and a layer of dielectric material with high thermal conductivity adjacent to the heater.

One particular embodiment of this disclosure is a magnetic slider. The slider has a slider body having an air bearing surface, a leading edge and a trailing edge, and a transducer on the air bearing surface proximate the trailing edge, the transducer comprising a read sensor and a write sensor. Also present is a heater in the slider body, positioned proximate the transducer, and a continuous dielectric layer comprising a dielectric material having a coefficient of thermal conductivity of at least 20 W/m-K, the dielectric layer positioned adjacent to and in contact with the heater and between the heater and the transducer.

Another particular embodiment of this disclosure is a method of reading data from a source. The method includes providing a slider having a heater and a read sensor, the slider including a dielectric layer having a coefficient of thermal conductivity of at least 20 W/m-K positioned between the heater and the read sensor, with the dielectric layer being in contact with the heater. The method further includes heating a portion of the slider to produce a heat-induced protrusion proximate the read sensor, and reading data from the source with the read sensor.

Yet another particular embodiment of this disclosure is a data storage system comprising a slider having a transducer and a data storage media operably positioned in relation to the transducer. The slider has a body, an air bearing surface, a leading edge and a trailing edge, with the transducer on the air bearing surface proximate the trailing edge. The slider further has a heater, positioned closer to the leading edge than the transducer, and a continuous dielectric layer comprising a dielectric material having a coefficient of thermal conductivity of at least 20 W/m-K, the dielectric layer positioned adjacent to and in contact with the heater and between the heater and the transducer.

These and various other features and advantages will be apparent from a reading of the following detailed description.

BRIEF DESCRIPTION OF THE DRAWING

The disclosure may be more completely understood in consideration of the following detailed description of various embodiments of the disclosure in connection with the accompanying drawing, in which.

DETAILED DESCRIPTION

Figure 1:
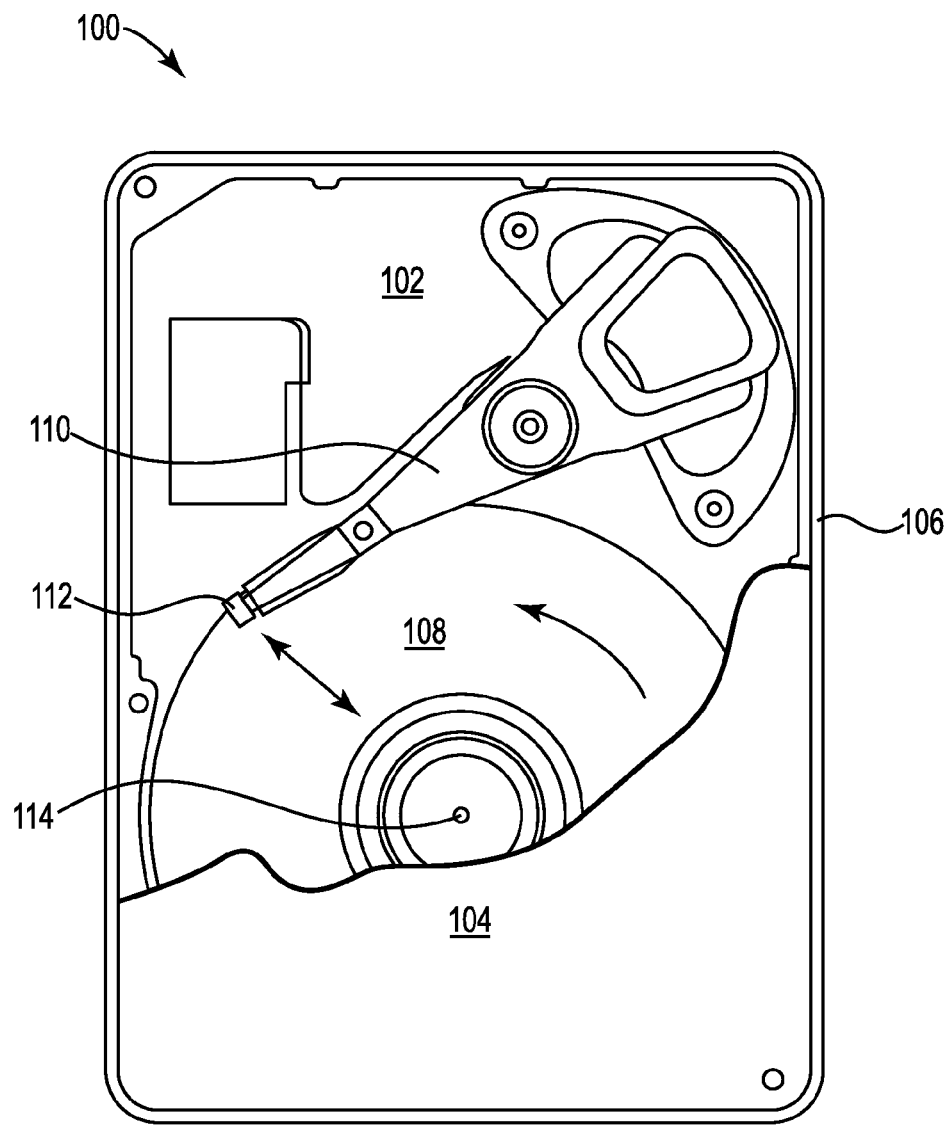
FIG. 1 is a schematic, top view of a hard disc drive.

Hard disc drives are common information storage devices having of a series of rotatable discs that are accessed by magnetic reading and writing elements. These data elements, commonly known as transducers, or merely as a transducer, are typically carried by and embedded in a slider that is held in a close relative position over discrete data tracks formed on a disc to permit a read or write operation to be carried out. Because the materials from which the transducer components are made have relatively large coefficients of thermal expansion, they are particularly subject to shape changes caused by variations in temperature. During operation of the slider, the various layers of the transducing head or slider are heated to cause a portion of the head to expand, and thereby protrude toward the magnetic disc and reduce the distance between the transducer and the disc.

To decrease the temperature observed by the reading and writing elements, a dielectric material having a high thermal conductivity is positioned between the heater and the elements(s), adjacent to the heater. In some embodiments, a push block is adjacent to the other side of the dielectric material.

In the following description, reference is made to the accompanying drawing that forms a part hereof and in which are shown by way of illustration at least one specific embodiment. The following description provides additional specific embodiments. It is to be understood that other embodiments are contemplated and may be made without departing from the scope or spirit of the present disclosure. The following detailed description, therefore, is not to be taken in a limiting sense. While the present disclosure is not so limited, an appreciation of various aspects of the disclosure will be gained through a discussion of the examples provided below.

Unless otherwise indicated, all numbers expressing feature sizes, amounts, and physical properties are to be understood as being modified by the term "about," whether or not the term "about" is immediately present. Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above those other elements.

Referring to FIG. 1, an exemplary magnetic disc drive 100 is schematically illustrated. Disc drive 100 includes base 102 and top cover 104, shown partially cut away. Base 102 combines with top cover 104 to form a housing 106, in which is located one or more rotatable magnetic data storage media or discs 108. Magnetic storage media 108 are attached to spindle 114 for co-rotation about a central axis. It should be noted that a pack of multiple discs or media 108 is utilized in some embodiments, and only a single disc or medium 108 is used in other embodiments. Each disc or medium surface has an associated slider 112 that is mounted adjacent to and in communication with its corresponding disc or media 108. Slider 112 includes a data recording transducer and a data reading transducer (also referred to as read/write heads, transducers, and the like), which read and write data to storage disc or media 108. In the example shown in FIG. 1, an actuator assembly 110 supports slider 112. The actuator assembly 110 shown in FIG. 1 is of the type known as a rotary moving coil actuator and includes a voice coil motor to rotate actuator assembly 110 with its attached slider 112 to position slider 112 and its read/write transducers over a desired data track along a path between an inner diameter and an outer diameter of disc or media 108.

Figure 2:
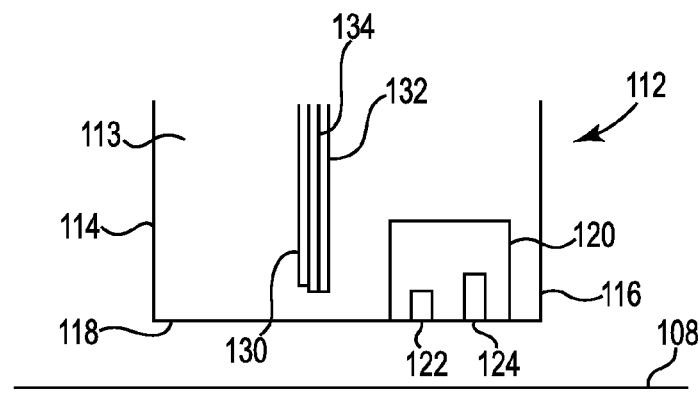
FIG. 2 is a schematic, enlarged side view of a slider.
Figure 3A:
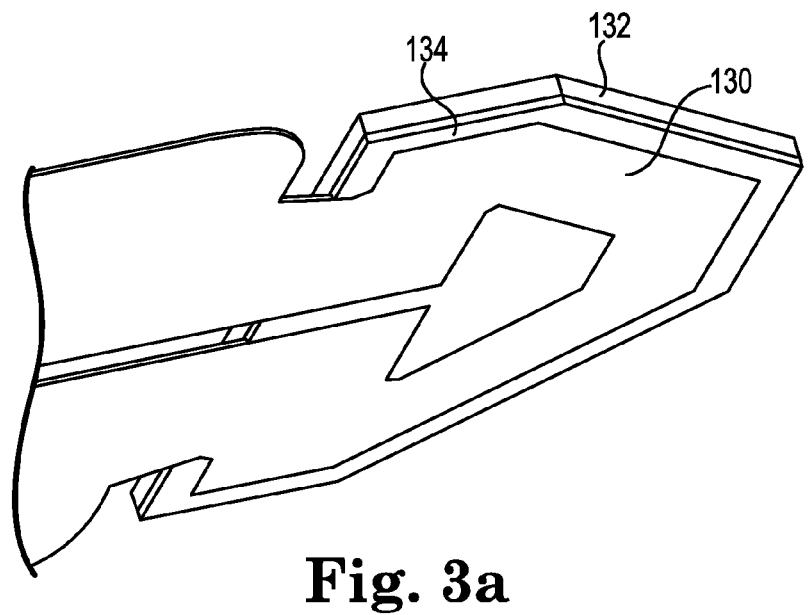
FIG. 3a is a schematic, enlarged perspective view
Figure 3B:
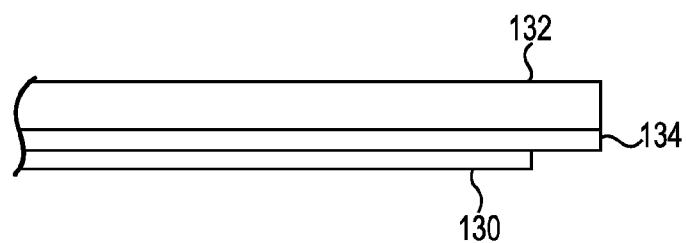
FIG. 3b is a corresponding side view of a heater, dielectric material layer, and push block.

FIG. 2 illustrates slider 112 enlarged to show various features such as the transducer, read head, the write head, the air bearing surface (ABS) or rails. Slider 112 has a body 113 defined by a leading edge 114, a trailing edge 116 connected by an air bearing surface (ABS) 118 that is designed with various topographical features to control the aerodynamic performance of slider 112 as it flies over rotating magnetic disc 108. In particular, air-bearing surface includes structural features such as rails, lands, ramps, depressions and the like that are designed to maximize the air-bearing surface pressure created by the stream of air flowing between ABS 118 and disc 108. Slider 112 includes a transducer 120 that is proximate or at trailing edge 116 of slider body 113. Transducer 120 includes a read sensor 122 and a write sensor 124. Slider 112 includes a heater 130 in body 113 to produce a heat-induced protrusion (not shown) that decreases the distance between transducer 120 and disc 108. In the illustrated embodiment, operably proximate to heater 130 is a push block 132, which has a higher coefficient of thermal expansion than body 113, or, which has a higher product of coefficient of thermal expansion times elastic modulus than body 113. Push block 132, when heated by heater 130, expands, thus 'pushing' a portion of body 113 and forming the protrusion. A portion of body 113 may also expand due to the increased temperature, thus adding to the protrusion. The protrusion extends, for example, about 10 nm below the level of ABS 118 towards discs 108. This protrusion, or stroke, decreases the distance between ABS 118 and disc 108.

Although one particular embodiment of a slider has been illustrated in FIG. 2, it is understood that the slider may have any number of various alternate configurations, including the location of transducer 120, the arrangement of read sensor 122 and write sensor 124, the position of heater 130, the number of heater(s) 130, and the presence or absence of push block 132. For example, the slider may not have a push block that expands forming the protrusion, but rather, heater 130 increases the temperature of body 113 and, due to the thermal expansion of body 113, the protrusion is formed. As another example, although one heater 130 is illustrated, the slider may have two heaters, one for each of read sensor 122 and write sensor 124. Two or more heaters 130 may operate independently, in parallel, or in series. As another example, heater 130 may be configured to operate (i.e., heat) when read sensor 122 is operational, during the reading process.

In accordance with this disclosure, adjacent to heater 130 is provided a layer of dielectric material 134 in physical contact with at least a portion of heater 130; this layer 134 has a higher thermal conductivity than body 113 of slider 112, yet is electrically insulating. In some embodiments, layer 134 may include a thin film or other layer (e.g., seed layer) thereon, both having a higher thermal conductivity than body 113. Dielectric layer 134, together with any additional film or layer, increases the rate of diffusion of heat from heater 130 to the material surrounding heater 130, thus increasing the efficiency of heater 130.

Layer 134 has a coefficient of thermal conductivity of at least 20 W/m-K, in some embodiments at least 30 W/m-K and in other embodiment at least 50 W/m-K. As an example, aluminum oxide or alumina ($Al_2O_3$), which is a common material for body 113, has a coefficient of thermal conductivity of about 1 to 1.3 W/m-K, whereas aluminum nitride (AlN) has a coefficient of thermal conductivity of 50 W/m-K, silicon has a coefficient of thermal conductivity of 149 W/m-K, and diamond has a coefficient greater than 1000 W/m-K.

In addition to having a high coefficient of thermal conductivity, the material for layer 134 is electrically insulating, inhibiting and avoiding shorting of the resistive heater 130. As examples, diamond has an electrical resistivity of about $10^{12}$ Ω-m at 20° C., and silicon has an electrical resistivity of about $10^3$ Ω-m at 20° C., although in most embodiments the resistivity of the material for layer 134 is at least $10^8$ Ω-m.

Examples of suitable material for layer 134 include aluminum nitride (AlN), diamond, silicon, and beryllium oxide (BeO), although other materials that meet the thermal conductivity and electrical insulating requirements can be used. Layer 134 may be formed entirely of the selected material or may be mixture or alloy of the material; for example, layer 134 may be composed of only aluminum nitride (AlN) or may be a mixture of aluminum nitride (AlN) and another material. In some embodiments, sintering aids or seeds, used during the formation of layer 134, may be present in the final layer. It is noted that these sintering aids or seeds may be present as a layer or partial layer between heater 130 and the dielectric material of layer 134; in such constructions, layer 134 is still considered to be physically in contact with heater 130. The resulting dielectric layer 134, whether a pure material, alloy, or having sintering aid or seeds throughout or as a layer, has the requisite coefficient of thermal conductivity and electrical conductivity/resistivity.

In most embodiments, layer 134 has a thickness of no more than 500 nm and at least 50 nm, and in other embodiments at least 100 nm. Layer 134 may have a thickness of no more than 250 nm. Some embodiments utilize a thickness of 200 nm for layer 134. The thickness of layer 134 generally will vary no more than 10% across layer 134. Layer 134 is preferably a continuous layer, free of pin holes and other gaps or defects in the dielectric material.

In the illustrated embodiment, push block 132 is positioned adjacent to and in contact with layer 134, on the side opposite heater 130, so that layer 134 is between heater 130 and push block 132; in other embodiments, push block 132 may be spaced from dielectric layer 134, for example, no more than about 0.5 micrometer. Push block 132 is formed of a material that has either a higher coefficient of thermal expansion than body 113 of slider 112 or a higher value of the coefficient of thermal expansion times the elastic modulus than body 113. Thus, when push block 132 increases in temperature due to heater 130, it physically increases in size, pushing a portion of body 113 to form the protrusion. Examples of suitable materials for push block 132 include copper (Cu) and various alloys thereof including copper nickel alloy, manganese (Mn) and various alloys thereof, ruthenium (Ru) and various alloys thereof, and titanium nitride (TiN) and nickel nitride ($Ni_3N_2$).

Layer 134, due to its high thermal conductivity, improves the heat conduction from heater 130 to push block 132, and thus, numerous advantages are obtained, particularly during the process of reading data from disc 108. For example, by including layer 134 between heater 130 and push block 132, the same temperature at heater 130 results in a higher temperature at push block 132 to form a larger protrusion or stroke, or in other terms, increases the pushiness of push block 132. Additionally or alternatively, by including layer 134 between heater 130 and push block 132, a decreased level of power can be applied to heater 130 to obtain the same protrusion or stroke while decreasing the temperature at transducer 120. Additionally or alternatively, by including layer 134 between heater 130 and push block 132, the distance between heater 130 and transducer 120 can be increased thus decreasing the temperature at transducer 120 while maintaining the protrusion or stroke. Additionally or alternatively, by including layer 134 between heater 130 and push block 132, the temperature of the heater material is reduced for a given amount of power dissipated.

This distance between heater 130 and transducer 120 is typically about 400 nm to 2 micrometers, but by including layer 134, this distance can be increased 1 to 2 micrometers, or, about 50-200%, over constructions where no dielectric layer 134 is present.

Dielectric layer 134 can be formed on heater 130 by conventional processes during the manufacture of slider 112. As an example, layer 134 can be deposited via CVD, plasma deposition, or the like. As indicated above, sintering aids or seed material may be used during the process.

Thus, embodiments of the SLIDER HAVING HEATER WITH ADJACENT HIGH THERMAL CONDUCTIVITY LAYER are disclosed. The implementations described above and other implementations are within the scope of the following claims. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A magnetic slider comprising:
   a slider body having an air bearing surface, a leading edge and a trailing edge;
   a transducer on the air bearing surface proximate the trailing edge, the transducer comprising a read sensor and a write sensor;
   a heater in the slider body, positioned proximate the transducer; and
   a continuous dielectric layer comprising a dielectric material having a coefficient of thermal conductivity of at least 20 W/m-K, the dielectric layer positioned adjacent to and in contact with the heater and between the heater and the transducer.

2. The slider of claim 1, wherein the dielectric layer comprises aluminum nitride (AlN).

3. The slider of claim 1, wherein the dielectric layer consists of aluminum nitride (AlN).

4. The slider of claim 1, wherein the dielectric layer has a coefficient of thermal conductivity of at least 30 W/m-K.

5. The slider of claim 1, wherein the dielectric layer has a thickness of no more than 500 nm.

6. The slider of claim 1, wherein the dielectric layer has a thickness of 100 nm to 250 nm.

7. The slider of claim 1, wherein the slider body comprises aluminum oxide ($Al_2O_3$).

8. The slider of claim 1 further comprising a push block, the dielectric layer positioned between the heater and the push block.

9. The slider of claim 8, wherein the push block is adjacent to and in contact with the dielectric layer.

10. The slider of claim 1 further comprising a second heater in the slider body.

11. A method of reading data from a source, comprising:
    providing a slider having a heater and a read sensor, the slider including a dielectric layer having a coefficient of thermal conductivity of at least 20 W/m-K positioned between the heater and the read sensor, the dielectric layer in contact with the heater;
    heating a portion of the slider to produce a heat-induced protrusion proximate the read sensor; and
    reading data from the source with the read sensor.

12. The method of claim 11, wherein heating a portion of the slider to produce a heat-induced protrusion comprises thermally expanding the dielectric layer to produce the heat-induced protrusion.

13. The method of claim 11, the slider further having a push block, and the method further comprising:
    thermally expanding the push block to produce the heat-induced protrusion.

14. The method of claim 13, wherein the dielectric layer is positioned between the heater and the push block.

15. The slider of claim 13, wherein heating a portion of the slider results in a higher temperature at the push block and larger heat-induced protrusion, compared to a theoretical slider not having the dielectric layer.

16. The slider of claim 13, wherein heating a portion of the slider can be done with a decreased level of power, compared to a theoretical slider not having the dielectric layer, to obtain the same protrusion and a decreased temperature at the read sensor.

17. The slider of claim 13, wherein a distance between the heater and the read sensor can be increased, compared to a theoretical slider not having the dielectric layer, thus decreasing the temperature at the read sensor while obtaining the same protrusion.

18. The slider of claim 14, wherein a temperature of the heater is reduced for a given amount of power dissipated, compared to a theoretical slider not having the dielectric layer, while obtaining the same protrusion.

19. A data storage system comprising:
    a slider having:
       a body, an air bearing surface, a leading edge and a trailing edge;
       a transducer on the air bearing surface proximate the trailing edge;
       a heater in the slider body, positioned closer to the leading edge than the transducer; and
       a continuous dielectric layer comprising a dielectric material having a coefficient of thermal conductivity of at least 20 W/m-K, the dielectric layer positioned adjacent to and in contact with the heater and between the heater and the transducer; and
    a data storage media operably positioned in relation to the transducer.

20. The system of claim 19, wherein the data storage media comprises at least one magnetic disc.

* * * * *